May 10, 1932.   W. MILLER ET AL   1,857,252
BALL OR ROLLER CLUTCH
Filed Jan. 23, 1929    2 Sheets-Sheet 1

Inventors:
WILLIAM MILLER,
HAROLD THOMAS LAMB.
by their Attorney:

May 10, 1932. W. MILLER ET AL 1,857,252
BALL OR ROLLER CLUTCH
Filed Jan. 23, 1929 2 Sheets-Sheet 2

Inventors:
WILLIAM MILLER,
HAROLD THOMAS LAMB.
by their Attorney:

Patented May 10, 1932

1,857,252

UNITED STATES PATENT OFFICE

WILLIAM MILLER, OF DUNSTON-ON-TYNE, AND HAROLD THOMAS LAMB, OF NEWCASTLE-ON-TYNE, ENGLAND

BALL OR ROLLER CLUTCH

Application filed January 23, 1929, Serial No. 334,462, and in Great Britain January 28, 1928.

This invention relates to ball or roller clutches of the kind wherein the clutch engaging means comprise concentric sets of rolling elements adapted to coact with a wedge surface to effect the engagement of the clutch members.

The object of the present invention is to provide a form of construction wherein for a given number of roller units the number of rolling elements is substantially reduced, with a view to strengthening and simplifying the construction, and improving the action of the clutch.

This object is attained according to the invention by substituting one series of rolling elements by a ring which is concentric with the clutch axis and at one of its cylindrical faces contacts with the remaining rollers, the said ring being mounted to turn freely under the action of the other set of rolling elements.

Figure 1:
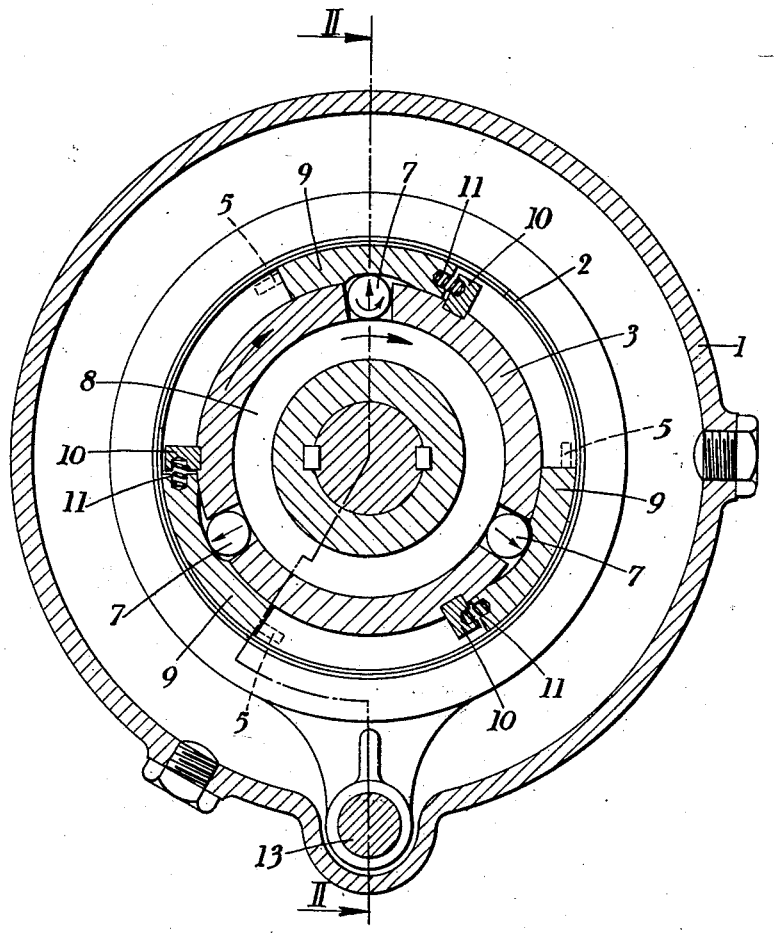

The invention will now be described by way of example with reference to the accompanying drawings which show a construction applied to a reverse brake for motor vehicles, the said reverse brake being combined with a free wheel clutch. In the said drawings:

Fig. 1 is an elevation in cross section taken on the line I—I of

Figure 2:
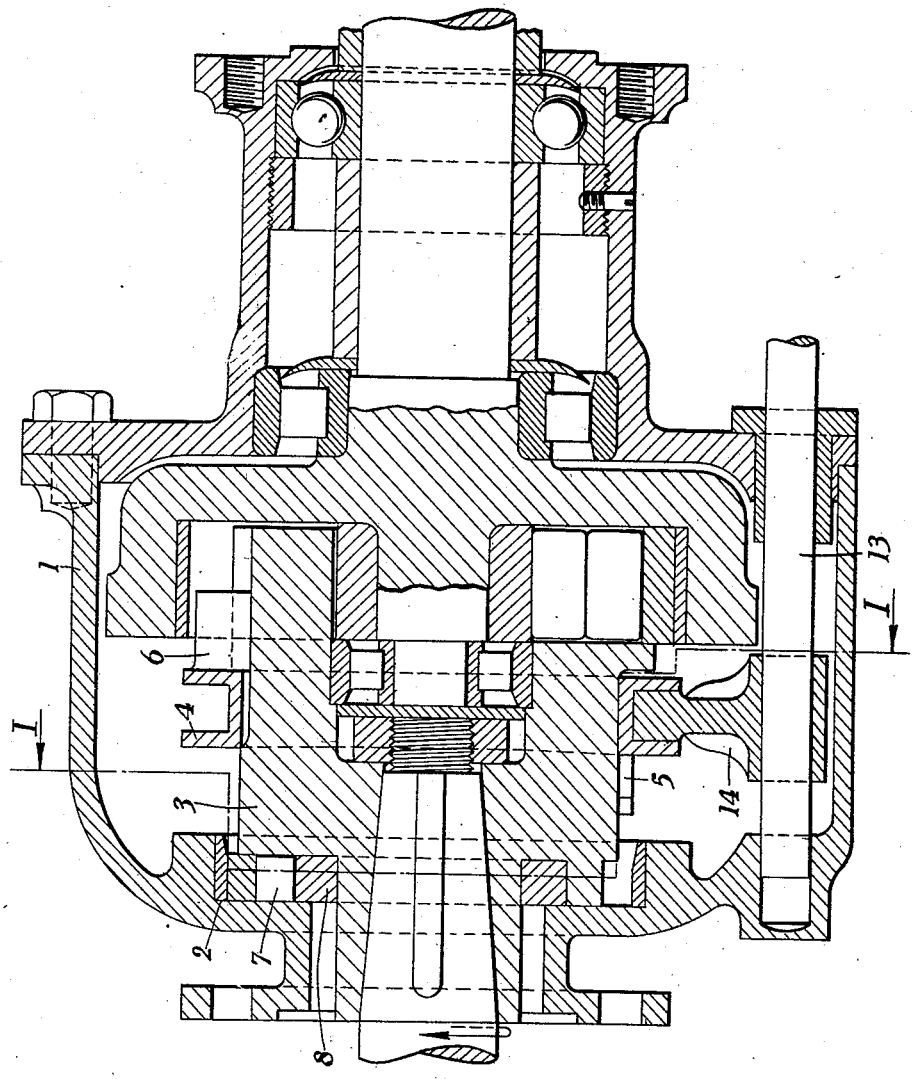

Fig. 2, which is a longitudinal elevation; and

Figure 3:
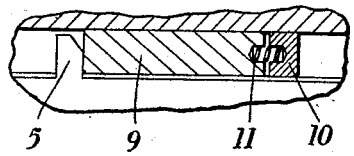

Fig. 3 is a fragmentary view showing the development of the wedge and stop system.

Referring more particularly to the drawings, 1 indicates the clutch casing which is secured to the rear portion of a gear box, and 2 is a hardened steel liner rigid with the casing 1 and forms with the casing the one reverse brake member. The inner or roller carrying members of the reverse brake and the free wheel clutch are made in one piece 3, a space being left between the two members to receive a grooved collar 4 which is splined to the member 3, and to each side of which are secured the ends of slidable stops. The stops for the reverse brake are indicated at 5, and those for the free-wheel clutch at 6.

Dealing with the reverse brake which embodies the clutch according to the present invention, the roller carrying member 3 is slotted to carry three single rollers 7, and at this portion is of reduced diameter, while an extension of the said member 3 carries a ring 8 rotatably mounted thereon, the said ring contacting with the rollers 7. Wedges 9 coact with the rollers 7, and in one direction are adapted to abut against stationary stops 10 rigid with the member 3, a spring 11 being interposed between each wedge and stop to maintain the former in contact with the roller 7.

The action of the reverse brake is as follows:—Assume the member 3 to be running in the direction of the arrow, the wedge 9 will tend to lag and the roller 7 will roll "up" the incline and thus exert pressure on the wedge face and on the ring 8 which moves in the direction indicated. The pressures between the clutch member 2, wedges 9 and rollers 7 are thus made to converge to a common centrally disposed member in such a way that they counterbalance each other, and an effective engagement is obtained between the members 1 and 2. In other words a sort of ring toggle action is set up, the rollers 7 being the "toggle arms" which are "jointed" to the ring 8 as shown diagrammatically.

When the member 3 is running in the normal direction, that is to say in the reverse direction to that of the arrow, the wedges again tend to lag, with the result that the narrow portions are maintained opposite the rollers 7, so that no engagement takes place.

When it is desired to throw the brake out of engagement so that it is free in both directions, the grooved collar 4 is moved to the left by means of the striking rod 13 and bridle 14, until the stops 5 come into the path of the wedges 9 as indicated in chain lines in Fig. 1. With the stops 5 in this position, when the member 3 is driven in the reverse direction to that shown in Fig. 1, the wedges 9 will tend to move with the member 3, but will be prevented by the stops 5, and the narrow portions of the wedges are retained opposite the rollers 7, so that no engagement takes place.

In order to ensure an easy working for the stops 5, these are chamfered, as shown in the development illustrated in Fig. 3.

We claim:

1. A roller clutch comprising two concentric clutch members one of which is a roller-carrying member having a plurality of radial slots therein, a rolling element in each of the slots of the said roller-carrying member, a concentric revoluble ring on the said roller-carrying member, the said ring contacting with the said rolling elements, and a slidable wedge interposed between each of the said rolling elements and the other clutch member.

2. A roller clutch according to claim 1, wherein the revoluble ring contacts with the innermost faces of the rolling elements.

3. A spragging device for motor vehicles and the like which includes a roller friction clutch comprising two clutch members, one of the clutch members being held stationary, clutch engaging means between the two clutch members, said clutch engaging means comprising a single acting wedge adapted to coact with each roller unit when the normal direction of rotation is reversed, slidable stops on the one clutch member adapted to be slid into the path of the wedges so that on the normal direction of drive being reversed the narrow ends of the said wedges abut against the said slidable stops and prevent engagement between the wedges and rollers.

4. A spragging device according to claim 3, and fixed stops on the clutch member carrying the slidable stops, each of said fixed stops being located adjacent and adapted to coact with the wide end of a wedge.

5. A spragging device according to claim 3, fixed stops on the clutch member carrying the slidable stops, each of said fixed stops being located adjacent and adapted to coact with the wide end of a wedge, and a spring between each fixed stop and the wide end of a wedge.

In witness whereof we have signed this specification.

WM. MILLER.
HAROLD T. LAMB.